United States Patent
Burenga et al.

(10) Patent No.: US 10,006,223 B2
(45) Date of Patent: Jun. 26, 2018

(54) POST DRIVER HAVING REVERSE TWISTED SPRING ASSEMBLY

(71) Applicants: Thomas I. Burenga, Litchfield, IL (US); Tim Burenga, Litchfield, IL (US)

(72) Inventors: Thomas I. Burenga, Litchfield, IL (US); Tim Burenga, Litchfield, IL (US)

(73) Assignee: Worksaver, Inc., Litchfield, IL (US)

( * ) Notice: Subject to any disclaimer, the term of this patent is extended or adjusted under 35 U.S.C. 154(b) by 262 days.

(21) Appl. No.: 14/544,437

(22) Filed: Jan. 7, 2015

(65) Prior Publication Data

US 2015/0197961 A1    Jul. 16, 2015

Related U.S. Application Data

(60) Provisional application No. 61/964,762, filed on Jan. 13, 2014.

(51) Int. Cl.
| | |
|---|---|
| *E04H 17/26* | (2006.01) |
| *F16F 3/06* | (2006.01) |
| *F16F 1/12* | (2006.01) |

(52) U.S. Cl.
CPC .......... *E04H 17/263* (2013.01); *F16F 1/125* (2013.01); *F16F 3/06* (2013.01)

(58) Field of Classification Search
CPC ............ E04H 17/263; F16F 1/125; F16F 3/06
USPC ........................................................ 173/202
See application file for complete search history.

(56) References Cited

U.S. PATENT DOCUMENTS

| | | | | |
|---|---|---|---|---|
| 2,028,351 A | * | 1/1936 | Pym ..................... | A43D 113/00 12/33 |
| 2,044,649 A | * | 6/1936 | Swennes .................. | F16F 3/10 217/54 |
| 2,086,321 A | * | 7/1937 | Kudo ...................... | F16F 1/042 267/180 |
| 2,183,100 A | * | 12/1939 | Holland .................... | F16F 3/06 213/40 R |
| 2,248,447 A | * | 7/1941 | Wood ..................... | F16F 1/125 267/136 |
| 2,493,811 A | * | 1/1950 | Graham ................. | A01B 35/22 172/40 |
| 2,559,478 A | * | 7/1951 | Stone .................... | B25D 9/145 173/124 |
| 2,639,589 A | * | 5/1953 | Smith ...................... | E02D 7/30 173/137 |

(Continued)

*Primary Examiner* — Hemant M Desai
*Assistant Examiner* — Lucas Palmer
(74) *Attorney, Agent, or Firm* — Paul M. Denk

(57) ABSTRACT

A post driver having a reverse twisted spring is disclosed which comprises a carriage, a driving ram which is movable relative to the carriage, a hydraulic cylinder assembly having a threaded hydraulic cylinder rod extending out of a first end of the hydraulic cylinder assembly, the threaded hydraulic cylinder rod capable of movement out of the hydraulic cylinder assembly and retracted back into the hydraulic cylinder assembly, the threaded hydraulic cylinder rod being connected to the driving ram, the hydraulic cylinder assembly having a second end being connected to the carriage, and a spring assembly comprising an outer spring and a reverse twisted spring within the outer spring, a first end having a screw-in plug, a threaded rod extending out of the screw-in plug in the first end with the threaded rod being connected to the driving ram, and a second end connected to the hydraulic cylinder assembly.

2 Claims, 4 Drawing Sheets

(56) References Cited

U.S. PATENT DOCUMENTS

| | | | | |
|---|---|---|---|---|
| 2,660,403 | A | 11/1953 | Roland | |
| 2,834,576 | A | 5/1958 | Ivey | |
| 2,894,723 | A | 7/1959 | Gustafson | |
| 2,940,267 | A | 6/1960 | Shaver | |
| 3,026,948 | A | 3/1962 | Pettee | |
| 3,030,056 | A * | 4/1962 | Rogers | F04B 39/127 248/565 |
| 3,052,435 | A * | 9/1962 | Roller | F16F 3/10 248/569 |
| 3,312,293 | A * | 4/1967 | Cutler | E01C 23/124 173/133 |
| 3,511,280 | A * | 5/1970 | Mercier | F15B 1/20 138/30 |
| 3,543,868 | A * | 12/1970 | Drake | E02D 13/06 173/124 |
| 3,783,953 | A * | 1/1974 | Kopaska | E04H 17/263 173/124 |
| 3,937,286 | A * | 2/1976 | Wagner | E04H 17/263 173/124 |
| 4,050,526 | A * | 9/1977 | Deike | E02D 7/10 173/115 |
| 4,509,473 | A * | 4/1985 | Hamparian | F01L 1/462 123/188.17 |
| 4,544,176 | A | 10/1985 | Helmick | |
| 4,561,636 | A * | 12/1985 | Moreland | E02D 7/20 254/29 R |
| 4,732,372 | A * | 3/1988 | Dickhart, III | B60G 11/16 267/204 |
| 4,915,180 | A * | 4/1990 | Schisler | E04H 17/263 173/185 |
| 5,090,486 | A | 2/1992 | Jones | |
| 5,248,001 | A * | 9/1993 | Moseley | B25D 11/06 173/1 |
| 5,282,511 | A * | 2/1994 | Burenga | B25D 17/28 173/184 |
| 5,437,341 | A | 8/1995 | Hom et al. | |
| 5,482,261 | A * | 1/1996 | Ortega | F16F 3/06 267/166 |
| 6,349,777 | B1 * | 2/2002 | Burenga | E04H 17/263 173/187 |
| 6,889,777 | B2 * | 5/2005 | Boley | E04H 17/263 173/112 |
| 7,467,787 | B2 * | 12/2008 | Adoline | F16F 3/04 267/168 |
| 8,292,274 | B2 * | 10/2012 | Adoline | F16F 9/0218 267/168 |
| 2002/0142893 | A1 * | 10/2002 | Koenig | A63B 21/00181 482/104 |
| 2007/0039748 | A1 * | 2/2007 | Kennett | E04H 17/263 173/117 |
| 2010/0320660 | A1 * | 12/2010 | Takeda | F16F 1/125 267/168 |
| 2011/0204550 | A1 * | 8/2011 | Pepka | F16F 1/125 267/168 |
| 2013/0200557 | A1 * | 8/2013 | Pepka | F16F 1/12 267/168 |
| 2016/0201353 | A1 * | 7/2016 | Niekamp | E04H 17/263 173/124 |

* cited by examiner

POST DRIVER HAVING REVERSE TWISTED SPRING ASSEMBLY

CROSS REFERENCE TO RELATED APPLICATION

This non-provisional patent application claims priority to the provisional patent application having Ser. No. 61/964,762, filed on Jan. 13, 2014.

FIELD OF THE INVENTION

This disclosure generally relates to a post driver device, and more particularly to a post driver having a reverse spiral spring or a reverse twisted spring assembly for reducing vibration, and thereby extending the useful life of the driver.

BACKGROUND OF THE INVENTION

Devices, such as hydraulic post drivers have been developed to automate the placement of posts into the ground. Many of these post drivers include a mounting bracket so that the post driver may be connected to a vehicle such as a tractor, a pickup truck, or a skid loader by a three-point hitch. Generally, the post driver draws power from the vehicle to which it is attached. The post driver may be powered by hydraulic, electrical, or mechanical energy. The post driver also has a driving ram that reciprocates during operation to provide repeat ramming of the post into the ground. The driving ram or weight is lifted by a hydraulic cylinder and released. The driving ram may be assisted in the downward direction by spring force, to strike the post and thus, drive the post into the ground until a desired height of the post above ground is accomplished.

The springs used in post drivers are subject to great vibrational forces over time. Due to these great forces, the springs deteriorate or fracture and need to be removed from the post driver and replaced. If the springs are not changed in time, then this could lead to malfunctioning of the post driver. Notwithstanding, when a broken or missing spring occurs, the ram is contained by the carriage and will continue to drive the post into the ground, even with or without springs. However, with a missing spring or springs, or the reverse spring, the hitting force will be reduced considerably. Furthermore, a broken spring, or parts thereof, could get caught between the carriage and the ram, and could lead towards malfunctioning of the driver. Such could further cause a breakdown in the components, which may be hazardous to an operator or anyone in the vicinity nearby. Also, when the springs need to be replaced, the post driver is taken out of operation until the repair is completed. The time that the post driver is down for repair is lost and this leads to a delay in constructing a fence.

The present disclosure is designed to obviate and overcome many of the disadvantages and shortcomings experienced with known post drivers. Moreover, the present disclosure is related to a post driver having a reverse spiral spring assembly that reduces vibration in springs incorporated in a post driver device. Further, the present disclosure is related to a post driver having a reverse twisted or spiral spring inside of a spring incorporated into a post driver which increases the durability and longevity of the spring. In this manner, the spring will not need to be replaced or serviced as often.

SUMMARY OF THE INVENTION

The present disclosure is directed to a post driver having a reverse twisted spring which comprises a carriage, a driving ram which is movable relative to the carriage, a hydraulic cylinder assembly having a threaded hydraulic cylinder rod extending out of a first end of the hydraulic cylinder assembly, the threaded hydraulic cylinder rod capable of movement out of the hydraulic cylinder assembly and retracted back into the hydraulic cylinder assembly, the threaded hydraulic cylinder rod being connected to the driving ram, the hydraulic cylinder assembly having a second end being connected to the carriage, and a spring assembly comprising an outer spring and a reverse twisted spring within the outer spring, a first end having a screw-in plug, a threaded rod extending out of the screw-in plug in the first end with the threaded rod being connected to the driving ram, and a second end having a screw-in plug with the second end being connected to the hydraulic cylinder assembly. It is also conceivable that the lower end of spring could be secured by brackets to the carriage, and be able to obtain and achieve the same results through the operations of this driver.

The present disclosure is also directed to a post driver having a reverse spiral spring which comprises a carriage having an upper end and a lower end, the lower end having an end plate having a pair of apertures, a driving ram which is movable relative to the carriage, a hydraulic cylinder assembly having a threaded hydraulic cylinder rod extending out of a first end of the hydraulic cylinder assembly, the threaded hydraulic cylinder rod capable of movement out of the hydraulic cylinder assembly and retracted back into the hydraulic cylinder assembly, the threaded hydraulic cylinder rod being connected to the driving ram, the hydraulic cylinder assembly having a second end having an end bracket for being connected to the end plate of the carriage, and a lower mounting bracket, and a spring assembly comprising an outer spring and a reverse spiral spring within the outer spring, a first end having a screw-in plug, a threaded rod extending out of the screw-in plug in the first end with the threaded rod being connected to the driving ram, and a second end having a screw-in plug with the second end being connected to the lower cylinder mounting bracket of the hydraulic cylinder assembly. The cylinder mounting bracket also functions as the spring mounting bracket for this device.

The present disclosure is further directed to a post driver having a reverse twisted spring which comprises a carriage, a driving ram which is movable relative to the carriage, a hydraulic cylinder assembly having a threaded hydraulic cylinder rod extending out of a first end of the hydraulic cylinder assembly, the threaded hydraulic cylinder rod capable of movement out of the hydraulic cylinder assembly and retracted back into the hydraulic cylinder assembly, the threaded hydraulic cylinder rod being connected to the driving ram, the hydraulic cylinder assembly having a second end being connected to the carriage, and a spring assembly comprising an outer spring and a reverse twisted spring positioned within the outer spring, the outer spring having an upper end having an upper screw-in plug, a threaded rod extending out of the upper screw-in plug in the upper end with the threaded rod being connected to the driving ram, a lower end having a lower screw-in plug with the lower end being connected to the hydraulic cylinder assembly.

In light of the foregoing comments, it will be recognized that the present disclosure provides a post driver having a reverse twisted spring inside of a spring assembly used in a post driver.

The present disclosure provides a post driver having a reverse twisted spring assembly that can be easily employed with highly reliable results and which requires less maintenance.

The present disclosure further provides a post driver having a reverse twisted spring assembly that incorporates a reverse twisted spring inside a spring that reduces vibration of the springs.

The present disclosure provides a post driver having a reverse twisted spring assembly that is easy operate and does not require any advanced or special training or tools.

The present disclosure provides a post driver having a reverse twisted spring assembly that incorporates a reverse twisted spring inside a spring that increases the longevity of the springs employed in a post driver.

The present disclosure provides a post driver having a reverse twisted spring assembly in which the spring assembly may be easily removed for repair or replacement.

The present disclosure further provides a post driver having a reverse twisted spring assembly in which an outer spring has a reverse twisted spring inserted into the outer spring with the reverse twisted spring encased within the outer spring.

These and other advantages of the present disclosure will become apparent to those skilled in the art after considering the following detailed specification in conjunction with the accompanying drawings.

DESCRIPTION OF THE PREFERRED EMBODIMENT

Figure 1:
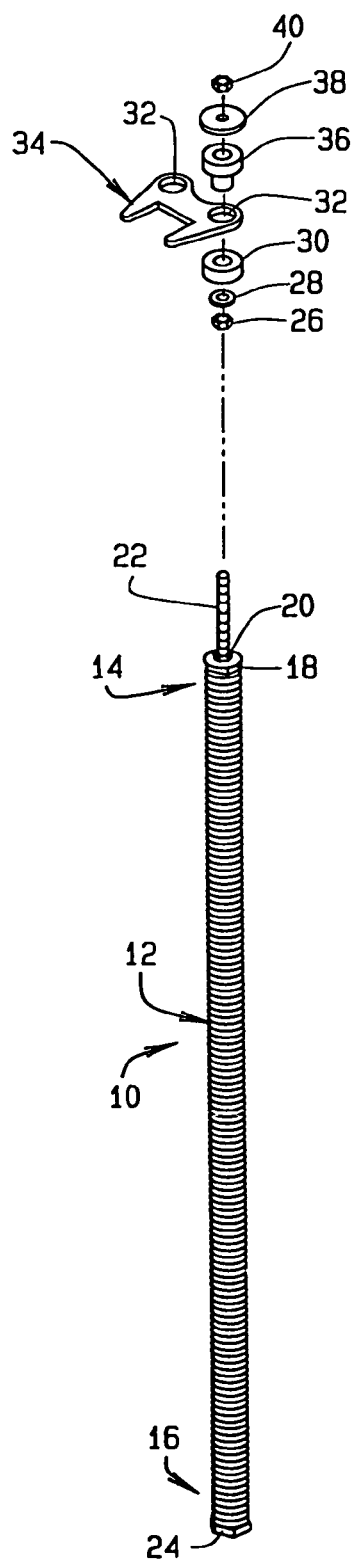
FIG. 1 is a partially exploded perspective view of a spring assembly constructed according to the present disclosure.

Referring now to the drawings, wherein like numbers refer to like items, number 10 identifies a spring assembly constructed according to the present disclosure. With reference now to FIG. 1, the spring assembly 10 is shown comprising an outer spring 12 having an upper end 14 and a lower end 16. The upper end 14 has an upper screw-in plug 18, a nut 20, and a threaded rod 22 extending out from the nut 20. The lower end 16 has a lower screw-in plug 24. The rod 22 is inserted into a lower nut 26, a lower washer 28, and a lower grommet 30, one of a pair of apertures 32 formed in an upper bracket 34, an upper grommet 36, an upper washer 38, and an upper nut 40. Although not shown in this particular view, a reverse twisted spring or a reverse spiral spring is inserted into the outer spring 12.

Figure 2:
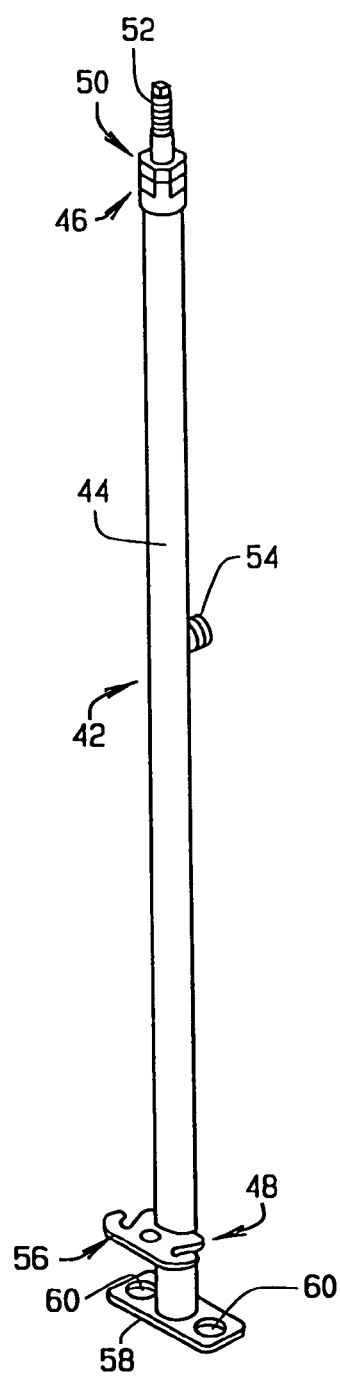
FIG. 2 is a perspective view of a hydraulic cylinder assembly constructed according to the present disclosure a spring assembly installed therein.

FIG. 2 shows a hydraulic cylinder assembly 42 that has an outer tube 44, an upper end 46, and a lower end 48. The upper end 46 has end cap assembly 50 having a rod seal (not shown) therein, and a threaded hydraulic cylinder rod 52 extending out from the end cap assembly 50. The outer tube 44 has a hydraulic fitting 54 that is connected to a source of hydraulic fluid (not shown). The threaded hydraulic cylinder rod 52 is capable of being extended out of the hydraulic cylinder assembly 42 and retracted back into the hydraulic cylinder assembly 42. The rod 52 is movable axially through the hydraulic cylinder assembly 42. The lower end 48 has a spring mounting bracket 56 connected to the outer tube 44 and a lower end bracket 58 connected to the lower end 48. The lower mounting bracket 56 is used to connect the spring assembly 10 thereto, as will be explained in detail further herein. The lower end bracket 58 has a pair of apertures 60. The lower end bracket 58 and the apertures 60 are used to connect the hydraulic cylinder assembly 42 to other structure (not shown), as will be discussed.

Figure 3:
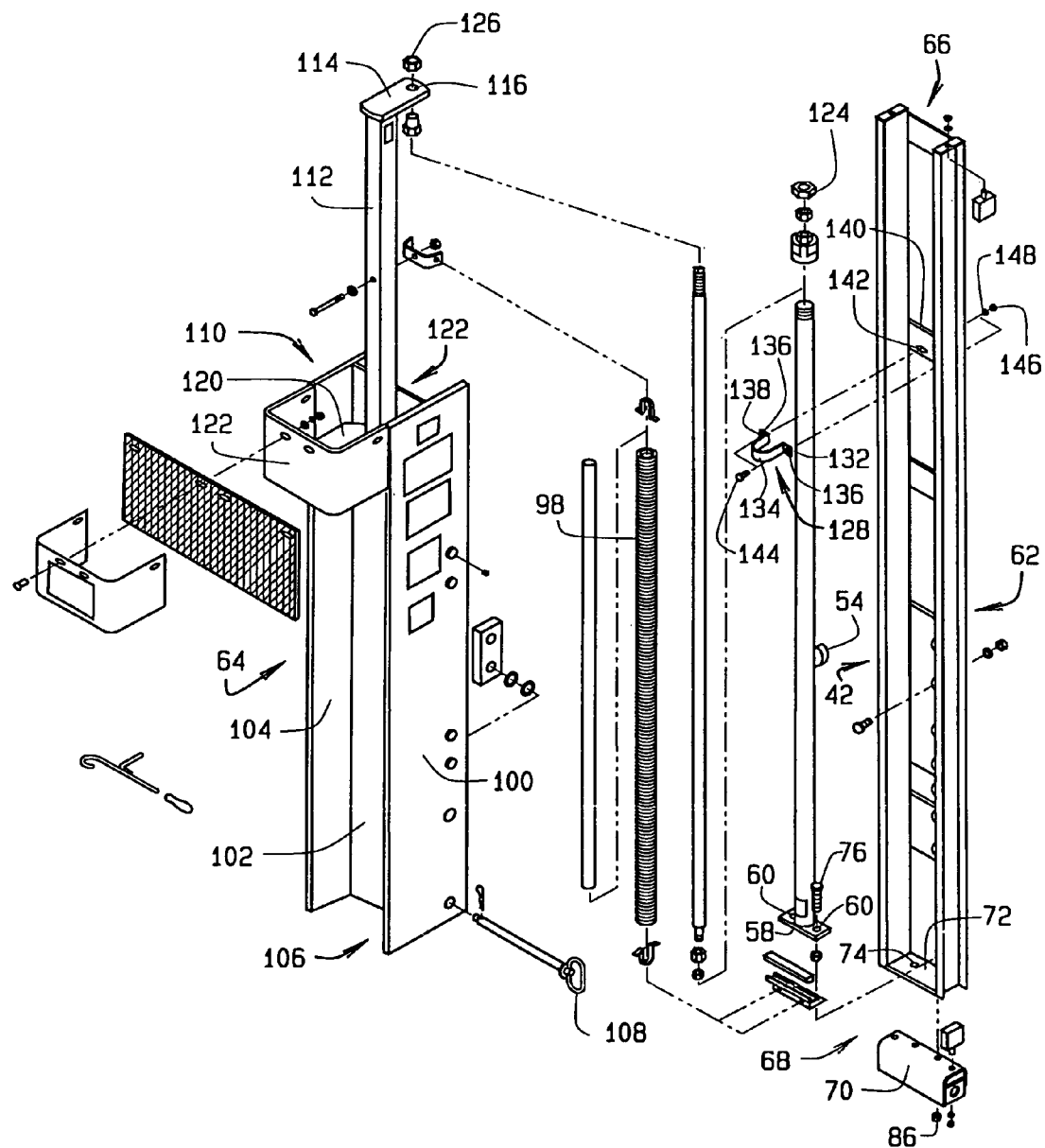
FIG. 3 is an exploded view of the spring assembly and the hydraulic cylinder assembly being installed in a post driver assembly.

With reference now to FIG. 3, the spring assembly 10 and the hydraulic cylinder assembly 42 are illustrated being installed on a carriage 62 and a movable driving ram 64. The carriage 62 has an upper end 66 and a lower end 68. The lower end 68 has a transport lock block 70 for locking the driving ram 64 to the carriage 62 when transporting the spring assembly 10, the hydraulic cylinder assembly 42, the carriage 62 and the driving ram 64. The lower end 68 has an end plate 72 having a pair of apertures 74 for securing the lower end bracket 58 in place. In this particular view only one of the apertures 74 formed in the end plate 72 is shown. In order to accomplish securing the lower end bracket 58 in place, a threaded bolt 76 is inserted through a lock washer 78, a washer 80, an upper grommet or bushing 82, the aperture 60 formed in the lower end bracket 58, a lower grommet or bushing 84, and a nut 86. The other aperture 60 in the lower end bracket 58 may use another set of items 76, 78, 80, 82, 84 and 86 to secure the lower end bracket 58 to the end plate 72 through the other aperture 74.

The lower end 16 of the spring assembly 10 is connected the lower mounting bracket 56 by use of a threaded bolt 88 and a washer 90. The threaded bolt 88 is threaded into the screw-in plug 24 through an aperture 92 formed in the plug 24. Although not shown, another spring assembly 10 may be connected to the lower mounting bracket 56 by use of another set of items 88 and 90. The upper end 14 of the spring assembly 10 is connected to the upper bracket 34 in the following manner. The threaded rod 22 is inserted through the lower nut 26, the lower washer 28, the lower grommet 30, and the aperture 32 in the upper bracket 34, the upper grommet 36, the upper washer 38, and the upper nut 40. In this manner, the threaded rod 22 of the upper end 14 of the spring assembly 10 is secured to the upper bracket 34. Although not shown, another spring assembly 10 may be connected to the lower mounting bracket 56 and the upper bracket 34 in the same manner by using another set of the items 88, 90, 26, 28, 30, 36, 38, and 40.

The spring assembly 10 is also shown having the screw-in plug 18, the nut 20, and the threaded rod 22. The screw-in plug 18 has a threaded aperture 94 for receiving a lower end 96 of the threaded rod 22 therein. A reverse spiral or twisted spring 98 also is adapted to be inserted into the outer spring 12. The screw-in plugs 18 and 24 are used to secure the outer spring 12 and to encase or capture the reverse spiral spring 102 within the outer spring 12.

The driving ram 64 has a right side 100, a back side 102, and left side 104 that is sized and shaped to have the carriage 62 fit within the driving ram 64. The driving ram 64 has a lower end 106 that has a transport lock pin 108. The transport lock pin 108 is used to lock the carriage 62 relative to the driving ram 64 when the transport lock pin 108 is inserted into the transport lock block 70. The driving ram 64 also has an upper end 110 having a post member 112 extending upward therefrom. The post member 112 has an upper plate member 114 having an aperture 116. The post member 112 also has a lower end 118 that is connected or welded to a ram plate member 120. The ram plate member 120 is connected to the sides 100, 102, and 104. A guard retainer 122 is also connected to the sides 100 and 104. Although not shown, a weight may be connected to the ram plate member 120 to facilitate ramming a post into the ground.

The hydraulic cylinder assembly 42 is connected to the upper plate member 114 of the post member 112 by inserting the threaded rod 52 through a step nut 124, the aperture 116 in the upper plate member 114, and a nut 126. The hydraulic cylinder assembly 42 is also secured to the carriage 62 by use of a cylinder stabilizer strap 128. The cylinder stabilizer strap 128 is generally U-shaped having a first end 130 having an aperture 132, a central member 134, and a second end 136 having an aperture 138. The carriage 62 has a cross member 140 having a pair of apertures 142, although only one of the apertures 142 is shown. The strap 128 is secured to the cross member 140 by use of a bolt 144 inserted through the aperture 132 and one of the apertures 142. A nut 146 and a washer 148 are used to secure the bolt 144 in place. Although not shown, another bolt 144 may be inserted into to the aperture 138 and the other aperture 142. Another nut 146 and washer 148 are used to secure the other bolt 144.

Figure 4:
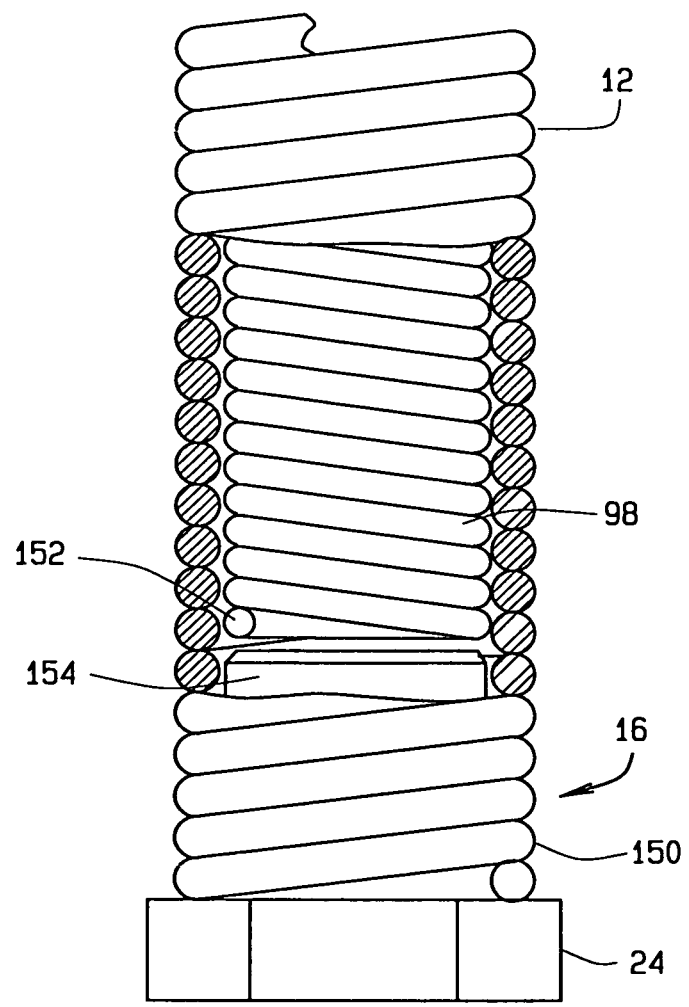
FIG. 4 is a partial cross-sectional of the spring assembly constructed according to the present disclosure.

FIG. 4 shows a partial cross-sectional view of the lower end 16 of the spring assembly 10. The outer spring 12 has a lower end 150 that is secured to the screw-in plug 24. The twisted or inner spring 98 has a lower end 152 that abuts against a top portion 154 of the screw-in plug 24. In this manner, the twisted spring 98 may be encased within the outer spring 12. It is also possible that the lower end 152 of the twisted spring 98 may be secured to the screw-in plug 24. Although not shown, the twisted spring 98 has an upper end that is encased by the screw-in plug 18.

Figure 5:
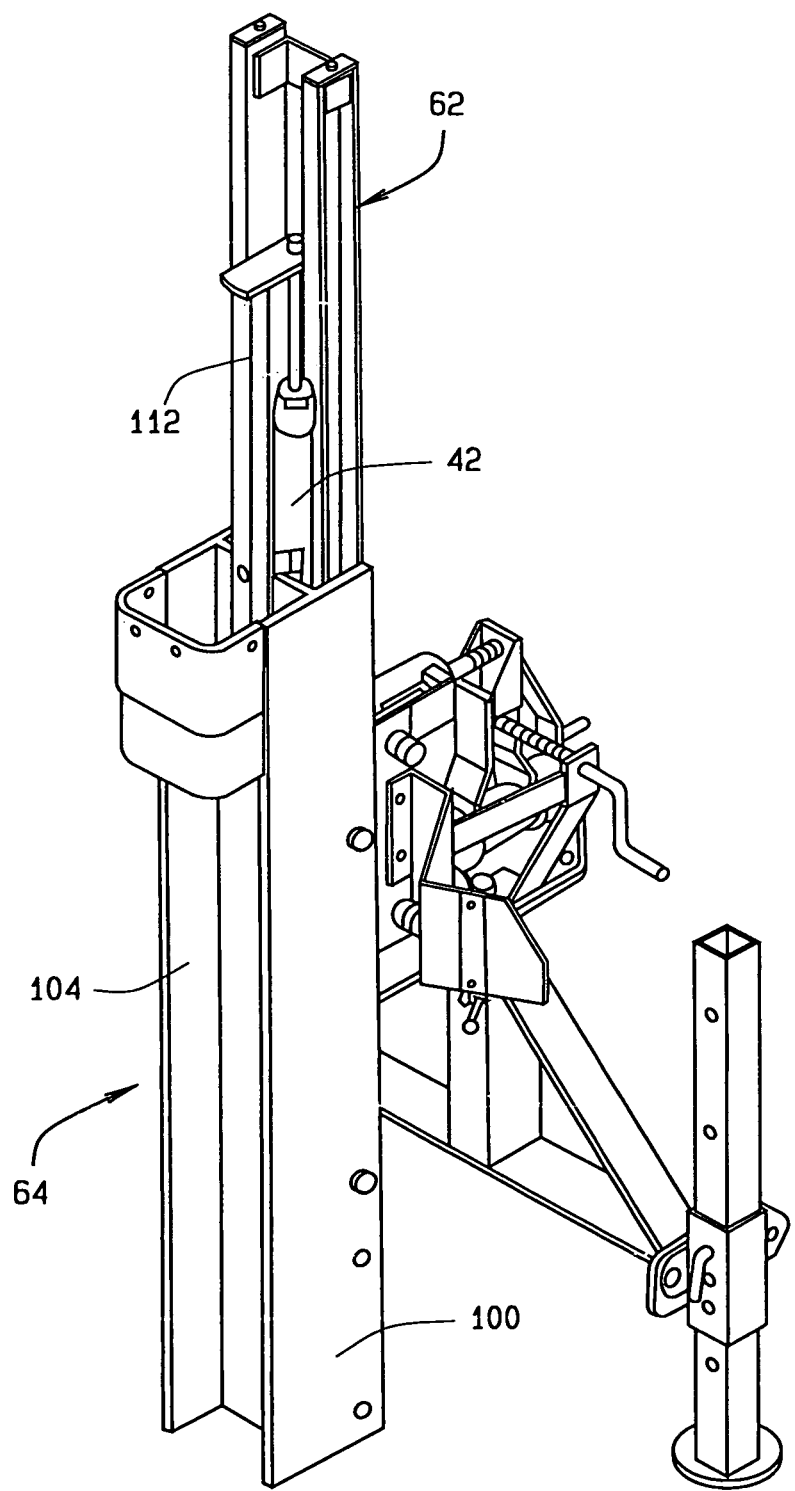
FIG. 5 shows the assembled post driver connected with its hitch mount when readied for driving a post into the ground through its operations and usage.

When the spring assembly 10, the hydraulic cylinder assembly 42, the carriage 62, and the driving ram 64 are fully assembled, as shown in FIG. 5, these components operate in the following manner. The components may be attached to a vehicle, such as a tractor, a pickup truck, but preferably a skid loader. The skid steer has a universal quick-attach, for quick installation of the post driver of this invention, in a manner similar to the attachment of other instruments to a skid steer, as known in the art. The hydraulic cylinder assembly 42 is connected to a source of hydraulic fluid that may be provided from the vehicle and a control valve that controls the flow of hydraulic fluid. Usually, the post driver is manually operated at the location of the post driver, and is usually not operated from the skid steers operators seat. Operation of the control valve will extend the rod 52 of the hydraulic cylinder assembly 42 which will also move the driving ram 64 upwards relative to the carriage 62. Once hydraulic pressure is released from the hydraulic cylinder assembly 42, the rod 52 will be retracted into the hydraulic cylinder assembly 42 and the spring assembly 10, the weight of the ram, and the force of gravity, will force the driving ram 64 downwardly relative to the carriage 62. The downward motion of the driving ram 64 will drive the ram plate member 120 and any weight attached thereto onto a post to drive or force the post into the ground. The driving ram 64 is lifted and driven numerous times in order to drive a post into the ground. As can be appreciated, the spring assembly 10 is stretched each time the driving ram 64 is extended or lifted upwardly relative to the carriage 62. The reverse twisted spring 98 within the spring 12 greatly reduces the vibrations of the springs 98 and 12 during operation. The reverse twisted spring 98 within the spring 12 increases the longevity of the spring 12. In this manner, the spring assembly 10 will last longer and will not have to be changed or replaced as often as is the case with the use of a spring.

As can be also seen in FIG. 3, there are a series of slide or guide blocks 160 that are secured to the inner surfaces of the right side 100 and left side 104 of the driving ram 64. Preferably, two such guide blocks are applied to each of the side walls. These guide blocks are designed for locating within the slots 162 of the carriage 62. This provides the guidance for the shifting upwardly of the driving ram 64, relative to the carriage 62, by efforts of the hydraulic cylinder assembly 42, and its connection to the post member 112, of the driving ram 64, as previously explained. The assembled post driver, as previously reviewed, is shown in FIG. 5.

From all that has been said, it will be clear that, there has thus been shown and described herein a post driver having a reverse twisted spring assembly. It will become apparent to those skilled in the art, however, that many changes, modifications, variations, and other uses and applications of the subject post driver having a reverse twisted spring assembly are possible and contemplated. All changes, modifications, variations, and other uses and applications which do not depart from the spirit and scope of the disclosure are deemed to be covered by the disclosure, which is limited only by the claims which follow.

We claim:

1. A post driver having a reverse twisted spiral spring to reduce vibration during usage, comprising:

a carriage having an upper end and a lower end, the lower end having an end plate having at least one aperture provided therein;

a driving ram which is movable relative to the carriage;

a hydraulic cylinder assembly having a threaded hydraulic cylinder rod extending out of a first end of the hydraulic cylinder assembly, the threaded hydraulic cylinder rod capable of upward movement out of the hydraulic cylinder assembly and retracted back into the hydraulic cylinder assembly, the threaded hydraulic cylinder rod being connected to the driving ram, the hydraulic cylinder assembly having a second end having an end bracket for being connected to the end plate of the carriage, and a spring mounting bracket;

a spring assembly comprising an outer spring and a reverse spiral twisted spring encased within the outer spring, said outer spring having a screw-in plug at its upper end, a threaded rod extending out of the screw-in plug and the first upper end of the threaded rod being connected to the driving ram, and a second lower end of said spring assembly having a screw-in plug with the second end being connected to the spring mounting bracket of the hydraulic cylinder assembly, said spring assembly when stretched and the post driver is released provided for reducing vibrations of the post driver during operations of said post driver;

said screw-in plug in the first upper end of the spring assembly is connected to the outer spring and the reverse spiral spring is encased by the screw-in plug and said outer spring, said screw-in plug in the second lower end is connected to the outer spring and the reverse spiral spring is encased by the screw-in plug and said outer spring;

said spring assembly further comprises a nut placed over the threaded rod extending out of the screw-in plug in the first upper end for securement of said reverse spiral spring to said driving ram, and said spring assembly further comprising a lower nut for connecting the lower end of said reverse spiral spring to the end plate of said carriage; and the driving ram further comprises an upper end having a post member extending upwardly therefrom, with said post member having an upper plate member having an aperture with the threaded hydraulic cylinder rod being connected to the upper plate member during operations of said post driver.

2. The post driver having a reverse spiral spring of claim 1 further comprising an upper bracket having a pair of apertures with the upper bracket being mounted to the driving ram for connecting the threaded rod of the spring assembly through one of the pair of apertures in the upper bracket.

* * * * *